US008845785B2

(12) United States Patent
Kusuura

(10) Patent No.: US 8,845,785 B2
(45) Date of Patent: Sep. 30, 2014

(54) AIR PURIFICATION SYSTEM AND METHOD USING AN ULTRASONIC WAVE

(75) Inventor: Takahisa Kusuura, Kanagawa (JP)

(73) Assignee: Empire Technology Development LLC, Wilmington, DE (US)

( * ) Notice: Subject to any disclaimer, the term of this patent is extended or adjusted under 35 U.S.C. 154(b) by 262 days.

(21) Appl. No.: 13/262,898

(22) PCT Filed: Nov. 26, 2010

(86) PCT No.: PCT/JP2010/071621
§ 371 (c)(1), (2), (4) Date: Nov. 30, 2011

(87) PCT Pub. No.: WO2012/070160
PCT Pub. Date: May 31, 2012

(65) Prior Publication Data

US 2012/0132071 A1 May 31, 2012

(51) Int. Cl.
*B03C 3/16* (2006.01)

(52) U.S. Cl.
USPC ................ 95/65; 95/71; 95/29; 96/53; 96/70; 96/389

(58) Field of Classification Search
CPC .... B01D 3/346; B01D 5/0039; B01D 5/0081; B01D 45/16; B01D 51/08
USPC ............... 55/292; 95/29, 65, 92; 96/126, 129, 96/389; 181/175, 177–181, 196–198, 181/207–211, 224–226, 238, 239, 181/259–261; 204/157.15, 157.3, 158.2, 204/196.33; 330/5, 5.5, 53–57; 422/127, 422/128
See application file for complete search history.

(56) References Cited

U.S. PATENT DOCUMENTS

| | | | |
|---|---|---|---|
| 5,419,877 | A | 5/1995 | Goforth et al. |
| 2007/0119970 | A1 | 5/2007 | Abate et al. |

FOREIGN PATENT DOCUMENTS

| | | | |
|---|---|---|---|
| CA | 2171965 | A1 | 3/1995 |
| CN | 200963362 | Y | 10/2007 |
| CN | 101484191 | A | 7/2009 |
| CN | 201596440 | U | 10/2010 |
| CN | 101884803 | A | 11/2010 |
| JP | 50-137866 | A | 11/1975 |

(Continued)

OTHER PUBLICATIONS

International Search Report and Written Opinion, PCT/JP2010/071621, dated Aug. 30, 2011.

(Continued)

*Primary Examiner* — Duane Smith
*Assistant Examiner* — Sonji Turner
(74) *Attorney, Agent, or Firm* — Pepper Hamilton LLP

(57) ABSTRACT

An air purification system comprises a chamber having an air inlet and an air outlet, a plurality of flexible wires hanging from a ceiling of the chamber, a spray mechanism configured to spray droplets in the chamber, and a sound wave generator configured to generate a standing sound wave in the chamber. During operation of the air purification system, the plurality of flexible wires are elastically deformed by the standing sound wave generated by the sound wave generator such that portions of the plurality of flexible wires converge at nodes of the sound wave, and also the droplets move to the nodes of the standing sound wave, while trapping particles in the air during the movement to the nodes. The droplets collide against and are adsorbed to the plurality of flexible wires at the nodes of the sound wave.

26 Claims, 16 Drawing Sheets

(56) References Cited

FOREIGN PATENT DOCUMENTS

| | | | |
|---|---|---|---|
| JP | 62-114625 | * | 5/1987 |
| JP | 06-142446 | A | 5/1994 |
| JP | 07-212894 | A | 8/1995 |
| JP | 07-313814 | A | 12/1995 |
| JP | 9-505512 | A | 6/1997 |
| JP | 09-323054 | A | 12/1997 |
| JP | 10-076126 | A | 3/1998 |
| JP | 2000-140539 | A | 5/2000 |
| JP | 2000-146546 | A | 5/2000 |
| JP | 2005-254043 | A | 9/2005 |
| JP | 2007-518900 | A | 7/2007 |
| JP | 2010-063961 | A | 3/2010 |
| WO | WO95/07749 | A1 | 3/1995 |
| WO | WO2005/052263 | A1 | 6/2005 |

OTHER PUBLICATIONS

Peltier Device, www.peltier-info.com/diagram1.gif, Printed from internet Sep. 20, 2011.

Thermoelectric Cooling, http://en.wikipedia.org/wiki/Thermoelectric_cooling, Printed from internet Sep. 16, 2011.

Diaphragm Ultrasonic Spray, www.patentip.com/08/F/F100351/DA10011.html, Printed from internet Sep. 16, 2011.

By studying the impact of Asian dust particles in air pollution, www.stelab.nagoya-u.ac.jp/ste-www1/div1/matsumi/kosa~analysis.htm, Printed from internet Sep. 20, 2011.

Introduction to Aerosol, http://cloudbase.phy.umist.ac.uk/people/dorsey/Aero.htm, Printed from Internet Sep. 16, 2011.

Takahashi et al., Noncontact manipulation of micro-objects by using acoustic energy. Printed from Internet Sep. 20, 2011. No English Translation Available.

Laurell et al., Chip integrated strategies for acoustic separation and manipulation of cells in particles, *Chem Soc Rev.* (Mar. 2007), 36(3):492-506.

Yamada, controlling surface wetting property by electrochemistry of monolayers its application for droplet manipulation, *Journal of the Surface Finishing Society of Japan* (2007), 58:785. English Translation not Available.

Ultrafine Wires Straight Lines—Industrial Cooperation www.kyorsitsu-metal.co.jp/product/pdt03.php4, Printed from Internet Sep. 20, 2011.

Micro Springs, Medical Coils and Guidewires, www.motiondc.com/products/micro-wire-components, Printed from Internet Sep. 20, 2011.

Elasticity (physics), http://en.wikipedia.org/wiki/Elasticity_%28physics%29, Printed from Internet Sep. 16, 2011.

Plasticity (physics), http://en.wikipedia.org/wiki/Plasticity_%28physics%29, Printed from Internet Sep. 16, 2011.

What Would the Plastic Deformation, http://www.geocities.jp/chappy_beagle/sosei/sosei.html, Printed from Internet Sep. 16, 2011.

Shape-memory alloy, http://en.wikipedia.org/wiki/Shape_memory_alloy, Printed from Internet Sep. 16, 2011.

Shape Memory Alloys, http://webdocs.cs.ualberta.ca/~database/MEMS/sma_mems/sma.html, Printed from Internet Sep. 16, 2011.

Shape Memory Alloys Interactive, http://www.smaterial.com/SMA/interactive/icb_background.html, Printed from Internet Sep. 16, 2011.

Multi-frequency unltrasonic cleaning machine suitable for ultra-precise work, http://www.nalex.co.jp/cleaner/multisoft.html, Printed from Internet Sep. 20, 2011.

Multi-frequency unitrasonic generators : Parts Washers: Ultrasonic Components, http://www.ctgclean.com/multi-frequency-ultrasonic.php, Printed from Internet Sep. 16, 2011.

Dhindsa et al., Reversible Electrowetting of Vertically Aligned Superhydrophobic Carbon Nanofibers, *Langmuir* (Oct. 10, 2006), 22(21):9030-9034.

http://www.kansai.meti.go.jp/2giki/kansai-seeds/seedsfils/nano/nn050_ru_saitou.pdf English translation not available (Printed from Internet Sep. 30, 2011).

* cited by examiner

*Figure 7*

```
GENERATE A STANDING SOUND      ─ 710
   WAVE IN THE CHAMBER
            │
            ▼
    GENERATE AND SPRAY          ─ 720
  DROPLETS IN THE CHAMBER
            │
            ▼
  GENERATE AIR FLOW FROM        ─ 730
THE AIR INLET TO THE AIR OUTLET
```

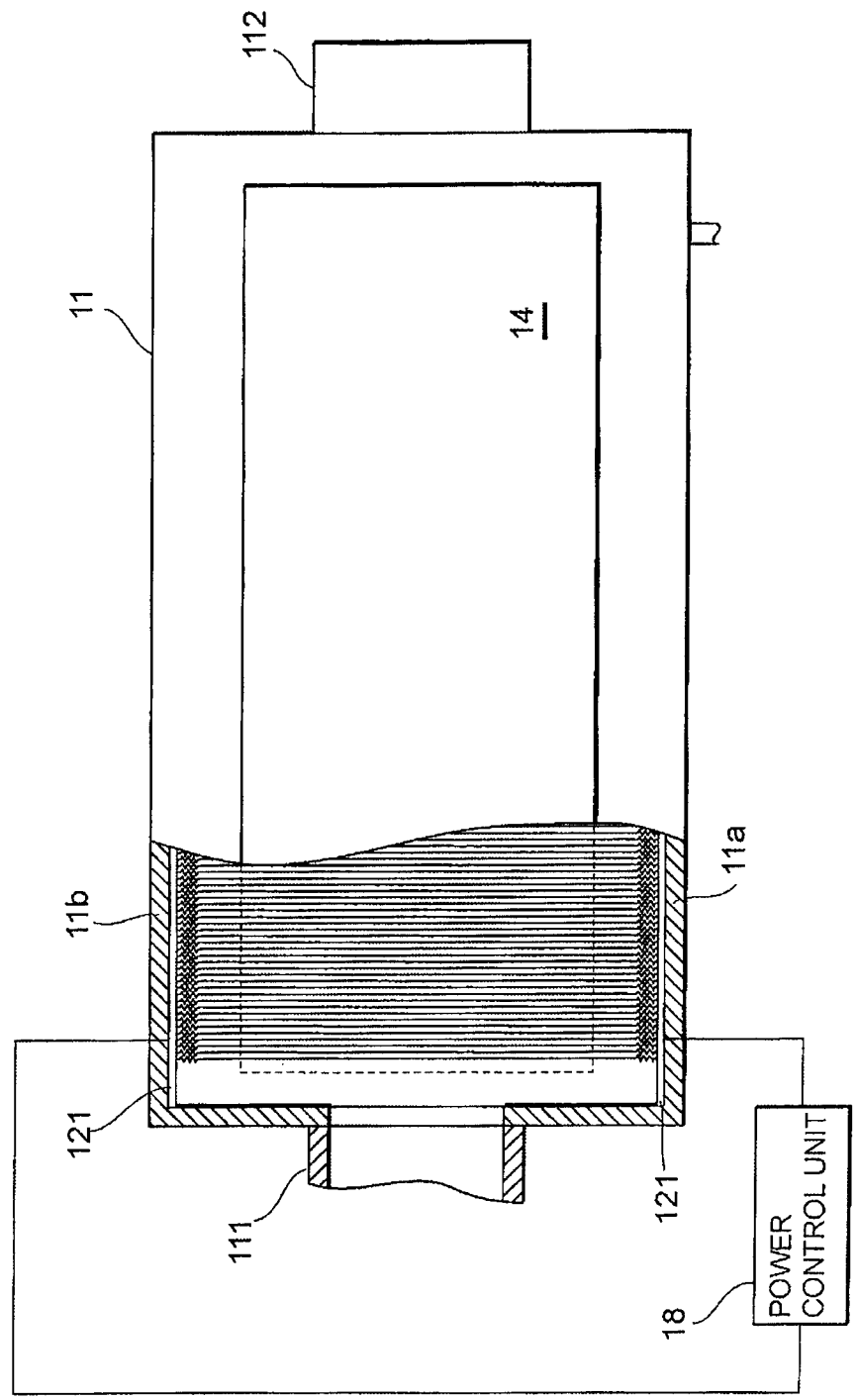

AIR PURIFICATION SYSTEM AND METHOD USING AN ULTRASONIC WAVE

This application is a U.S. national stage filing under 35 U.S.C. §371 of International Application No. PCT/JP2010/071621 filed Nov. 26, 2010 entitled "Air Purification System and Method Using an Ultrasonic Wave," the disclosure of which is incorporated by reference in its entirety.

BACKGROUND

Air purification systems may be used for purifying air contaminated with pollutants, such as dust, tobacco smoke, and pollen, in enclosed environments. Conventional air purification systems may purify the contaminated air by filtering the contaminated air through microporous filters, such as activated charcoal filters and/or HEPA filters, using a blower fan. However, the air purification using such a filter causes a pressure drop therein, and thus a relatively-large volume air has to be delivered in order to achieve a sufficient trapping efficiency of the filter. Among others, such a pressure drop becomes particularly remarkable when the filters clog with the trapped particles after a long-term use, and accordingly degradation in the performance of the filters becomes significant. In order to avoid such situations, users have to often replace the clogged filter with a new filter.

In recent years, consumer needs for trapping finer particles, such as aerosol, viruses, and volatile organic compounds (VOCs), have grown, and in order to meet such needs, the dimensions of pores in the filters are desired to be reduced so that such particles can be trapped. However, the smaller the pores in the filters are, the lower the trapping efficiency becomes relative to a blower fan. Under the circumstances, an attempt to reduce the thickness of filters has been made; however, the filters with the reduced thickness cannot ensure a sufficient strength.

The foregoing and other objects, features and advantages of the present disclosure will be apparent from the following more particular description of preferred embodiments of the present disclosure, as illustrated in the accompanying drawings. Understanding that these drawings depict only several embodiments in accordance with the disclosure and, therefore, not to be considered as limiting its scope, the disclosure will be described with additional specificity and detail through the use of the accompanying drawings.

BRIEF DESCRIPTION OF DRAWINGS

FIG. 7 is a flow chart illustrating a method of operation of an air purification system in accordance with the present disclosure.

FIG. 13 is a schematic illustration of an example of an air purification system arranged in accordance with the present disclosure.

DETAILED DESCRIPTION

Reference will now be made in detail to embodiments, examples of which are illustrated in the accompanying drawings. The drawings are intended to be explanatory and may not be drawn to scale. In the following detailed description, numerous specific details are set forth in order to provide a thorough understanding of the present invention. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

The present disclosure describes techniques, devices, apparatus, and systems for air purification including, but not limited to, generating a standing wave field in a chamber, aggregating fine particles contained in the air in the chamber, as well as droplets which trap such fine particles, into specific positions (i.e., the positions of nodes) and collecting the aggregated fine particles and droplets using a number of wires.

Figure 1:
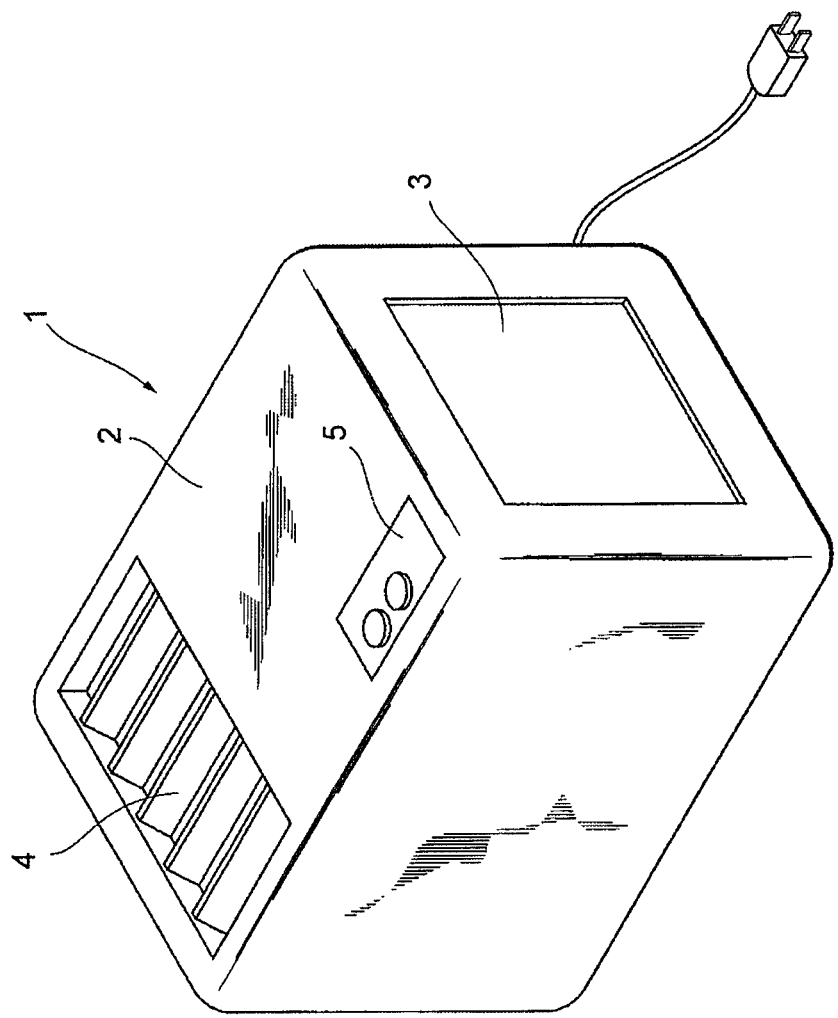
FIG. 1 is a schematic illustration of an example of an air purification apparatus equipped with an air purification system arranged in accordance with the present disclosure.

FIG. 1 is a schematic illustration of an example of an air purification apparatus 1 equipped with an air purification system arranged in accordance with the present disclosure. Referring to FIG. 1, the air purification apparatus I may include a housing 2 substantially defining the exterior thereof The housing 2 may be made of, but not limited to, a resin material, such as polyethylene, polycarbonate, or acrylonitrile butadiene styrene (ABS). Although not shown in FIG. 1, an air purification system is accommodated in the housing 2. The air purification apparatus 1 may include, but is not limited to, one or more exterior air inlets 3 located at, for example, one side portion of the housing 2 and one or more exterior air outlets 4 located at, for example, an upper portion of the housing 2. The exterior air inlet 3 and the exterior air outlet 4 may include barriers such as grilles. The air purification apparatus 1 also includes electronic circuitry disposed in the housing 2 and one or more control switches 5 including a power switch disposed to be operated by a user. In another example, the control switches may be located on one side portion. Any types of switches may be used for the control switches 5. Operation of the air purification apparatus 1 may be controlled by the power switch. The electronic circuitry controls various electrically-driven devices installed in the air purification apparatus 1.

Figure 2:
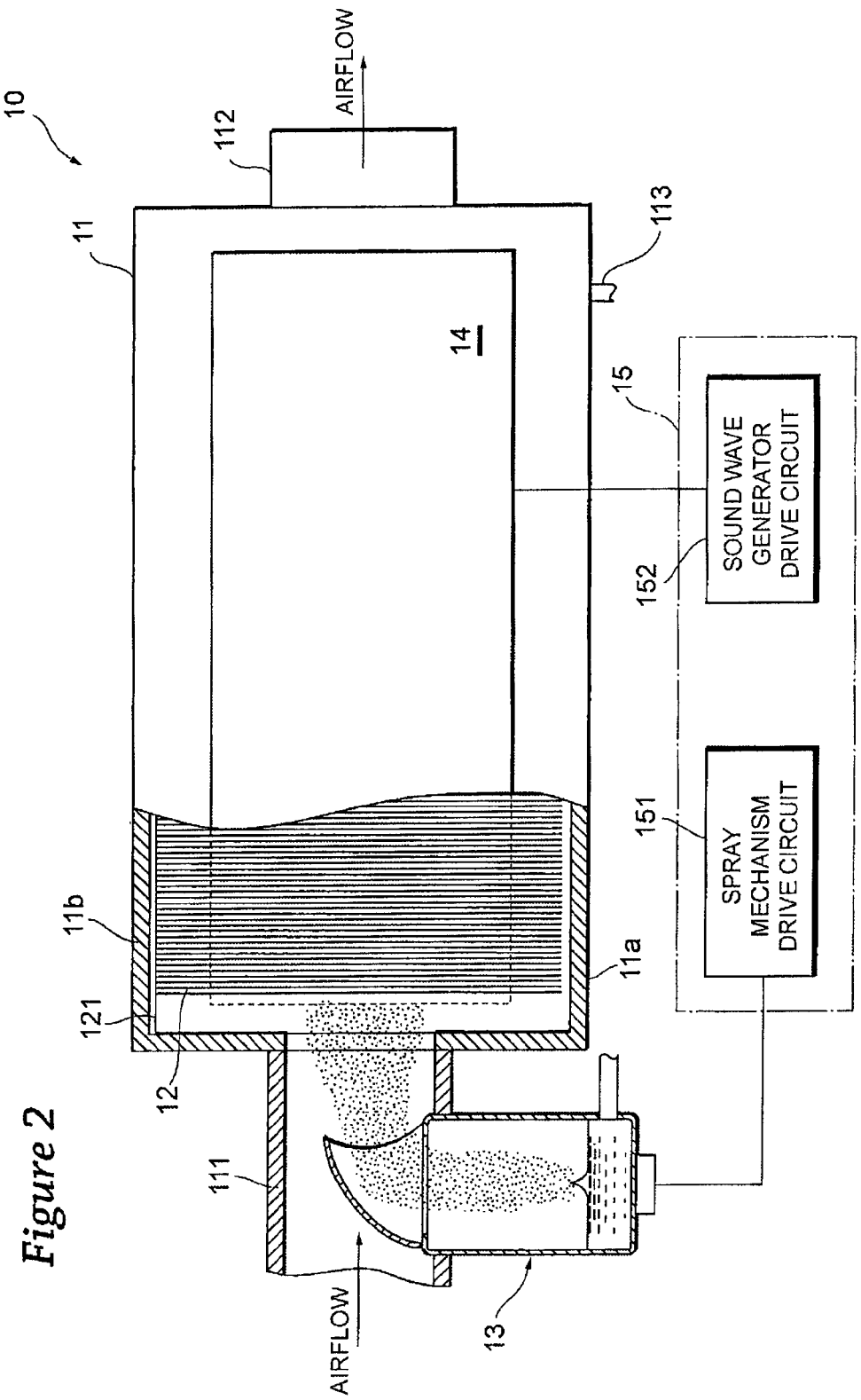
FIG. 2 is a schematic partial cross-sectional illustration of an example of an air purification system arranged in accordance with the present disclosure.

FIG. 2 is a schematic partial cross-sectional illustration of an example of an air purification system 10 arranged in accordance with the present disclosure. Referring to FIG. 2, the air purification system 10 may include, but is not limited to, a chamber 11, a plurality of flexible wires 12, at least one spray mechanism 13, and at least one sound wave generator 14. The air purification system 10 may further include at least one control device 15 including at least one spray mechanism drive device 151 and at least one sound wave generator drive device 152. The control device 15 may be adapted to comprehensively control the operation of the overall air purification apparatus 1. An example of the configuration of the control device 15 will be discussed with reference to FIG. 15.

The chamber 11 is in the form of, but not limited to, a generally-rectangular parallelepiped shape configured to propagate a sound or acoustic wave therein. The chamber 11 may be formed from, for example, a resin material such as polyethylene, polycarbonate or ABS, or a metal material such as aluminum or stainless steel. The chamber 11 may include, but is not limited to, at least one air inlet 111 and at least one air outlet 112 that define an airflow path. At least one fan may optionally be located in the vicinity of the air outlet 112 to produce an airflow. In another example, a fan may be optionally be located in the vicinity of the inlet 111. The air inlet 111 and the air outlet 112 may be configured to be located on opposite walls of the chamber 11. The air inlet 111 and the air outlet 112 may operatively communicate with the exterior air inlet 3 and the exterior air outlet 4 of the housing 2 through air ducts, respectively. The chamber 11 may include at least one drain 113 located on a lower portion 11a thereof to drain water which is adsorbed and collected by the flexible wires 12.

Figure 12A:
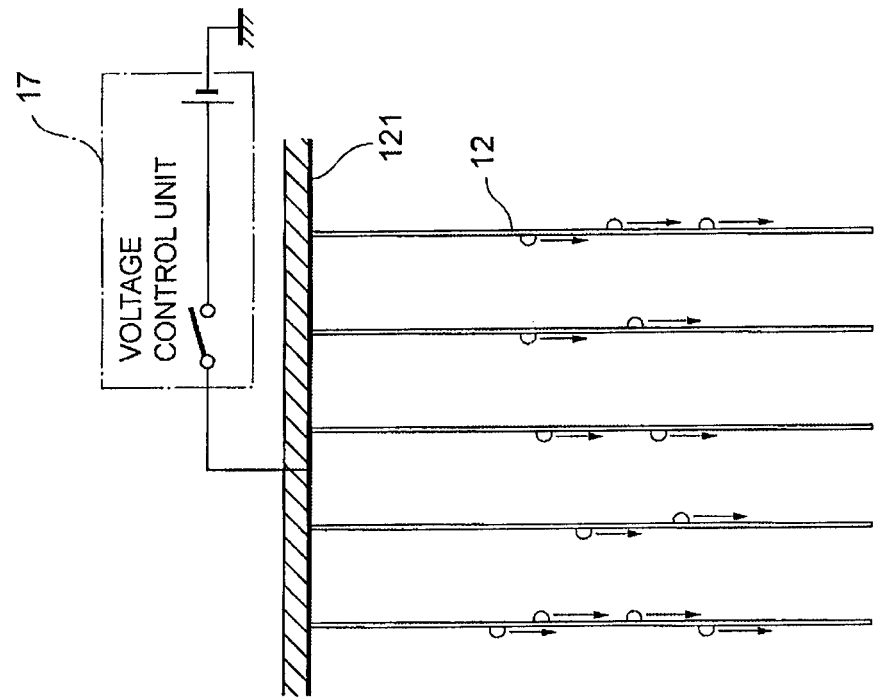
FIGS. 12A and 12B are schematic illustrations of a relationship between the formation of ultrasonic standing waves and electrowetting on the operation of an air purification system arranged in accordance with the present disclosure.
Figure 12B:
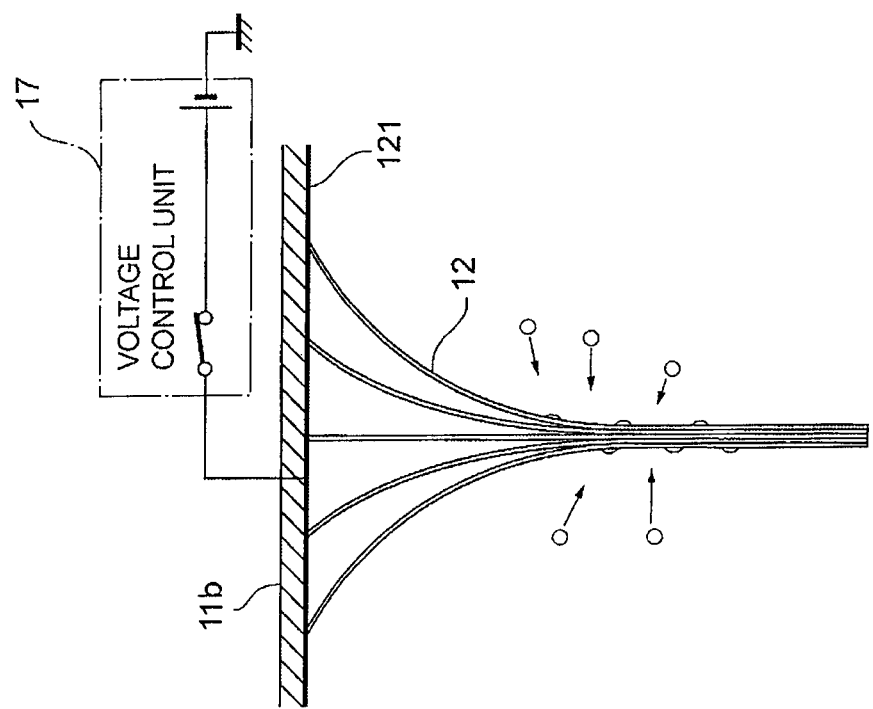
Figure 14A:
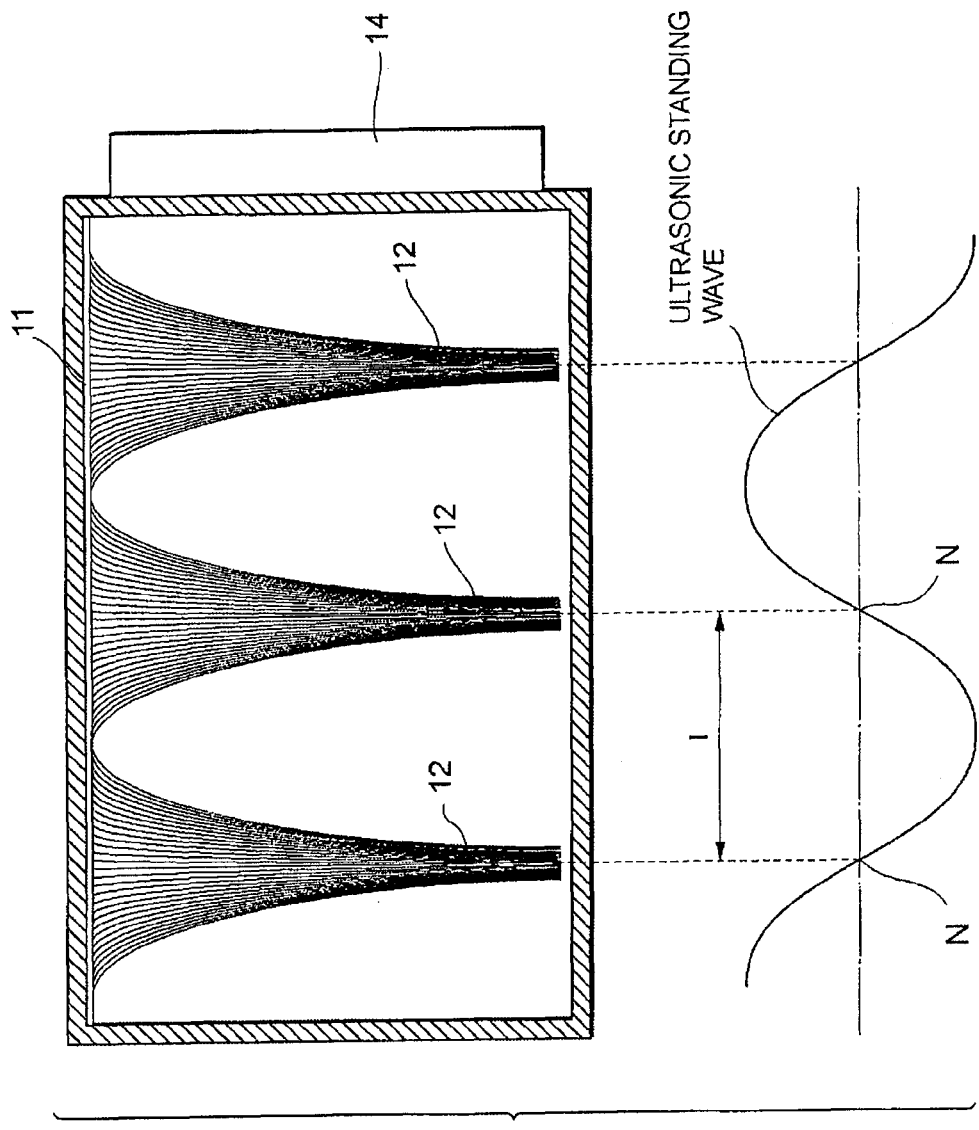
FIGS. 14A and 14B are schematic illustrations of the relationship between frequency nodes and behaviors of flexible wires in an air purification system arranged in accordance with the present disclosure.
Figure 14B:
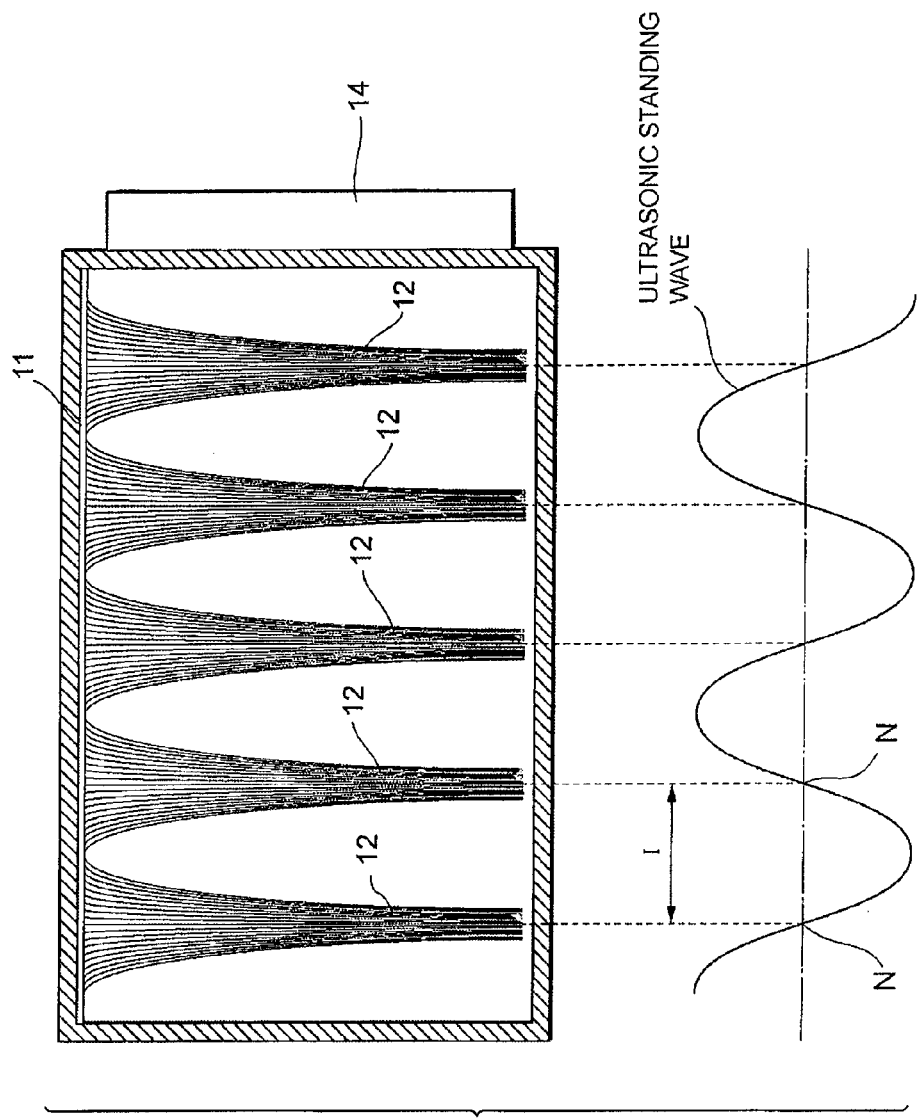

The flexible wires 12 are each arranged such that one end thereof is attached to an upper portion 11b of the chamber 11, the attachment configured to allow the flexible wires 12 to hang substantially perpendicular to the upper portion due to their own weight, i.e., hanging toward the lower portion 11a of the chamber 11. The length of the flexible wires 12 may generally be any length, although typically the length will be equal to or less than the height of the chamber 11. The length of the flexible wires 12 may be selected to a large extent depending on the height of the chamber 11. Several examples of the length of the flexible wires 12 are about 100 mm, about 200 mm, about 300 mm, about 400 mm, about 500 mm, and ranges between any two of these values. The flexible wires 12 may, in part, function as an adsorption filter for fine particles including droplets or mists suspended in the air atmosphere in the chamber. The flexible wires 12 may be bonded to a conductive or non-conductive resin layer 121 formed on the upper portion 11b by way of a known bonding technique such as brazing. The conductive properties of the resin layer 121 may be selected depending on conductive properties of the flexible wires 12. The resin layer 121 may be used for ensuring electrical connections between the flexible wires 12 and at least one voltage control unit 17 (see FIGS. 12A and 12B). The opposite ends of the flexible wires 12 may be in contact with, or spaced apart from, a surface of the lower portion 11a.

The flexible wires 12 may be ultrafine wires. The flexible wires 12 may be made of, but not limited to, metal, alloy, or non-metal material. The diameter of the flexible wires 12 may be in a range of, but not limited to, about 10 μm to about 50 μm, or about 100 μm to about 500 μm. For example, the ultrafine wires manufactured by Kyoritsu Metal Industry Co. Ltd. may be employed. The flexible wires 12 are configured to be elastically deformable by an external force (e.g., a sound pressure). In another example, the flexible wires 12 may be made from a conductive polymer material. Polythiophene such as poly(3,4-ethylenedioxythiophene) may be used as the conductive polymer material. In a further example, a shape-memory-alloy (SMA) may be adapted for the flexible wires 12. Alternatively, non-conductive wires such as synthetic fibers may be used. In a case where the flexible wires 12 are designed to have electrical conductivity, the flexible wires 12 may be coated with a self-assembled monolayer (SAM). In an illustrative embodiment, SAM may be an alkanethiol SAM, which is known to have an electrowetting effect as discussed further below.

The spray mechanism 13 is associated with or located in the air inlet 111 and configured to supply finer droplets or mists to the chamber 11. The dimension of the droplets or mists may generally be any dimension. The dimension of the droplets or mists may be in a range of, for example, about 1 μm and 100 μm, or about 10 μm and about 100 μm. A smaller dimension of the droplets or mists may increase contact areas thereof with the pollutants. The increase in contact area may facilitate trapping the pollutants. In some embodiments, the spray mechanism 13 may be located within the chamber 11, per se (not shown). A non-limiting example of the spray mechanism 13 may include an ultrasonic atomizing unit 131 for generating and spraying fine droplets or mists (see FIG. 6). In another non-limiting example, a sprayer which sprays droplets or mists with a high-speed airflow or compressed air may be employed. Further, a device such as an evaporative humidifier may be employed. The spray mechanism 13 may be driven by the spray mechanism drive device 151.

The sound wave generator 14 is located on a side portion of the chamber 11 and configured to generate a sound wave in the chamber 11. The sound wave has a force or pressure caused by an air wave, which is a mechanical vibration, and its energy may be referred to as a sound energy. The sound wave may be, but is not limited to, an ultrasonic wave or a high-frequency wave in order to reduce noise and/or maintain silence. An example of a frequency of the sound wave is in a range of about 20 KHz to about 170 KHz, or about 50 KHz to about 150 KHz. Specific examples of frequencies include about 20 KHz, about 50 KHz, about 100 KHz, about 150 KHz, about 170 KHz, and ranges between any two of these values. The sound wave generator 14 may include an ultrasonic transducer including one or more piezoelectric devices. Typically, the piezoelectric devices of the sound wave generator 14 may be arranged in an array and driven so that a plane, standing wave can be generated in the chamber 11. The sound wave generator 14 may be driven by the sound wave generator drive device 152.

It is known that acoustic pressure waves allow fine objects or particles to be displaced. More specifically, when fine objects, which are sufficiently small relative to the wavelength of the sound wave, are present in a standing wave field, the fine objects aggregate at the intervals of the half wavelength due to the sound radiation effect acting from antinodes toward nodes of the acoustic wave. For example, assuming that the sound speed in the air is about 330 m/sec, the wavelength of a sound wave of 20 kHz can be obtained as follows:

330 m/20000 Hz=16.5 mm.

Accordingly, the nodes of the standing wave exist at every 8.25 mm. The force of sound radiation increases and thus an energy for moving an object also increases in accordance with the magnitude of acoustic pressure.

Figure 3:
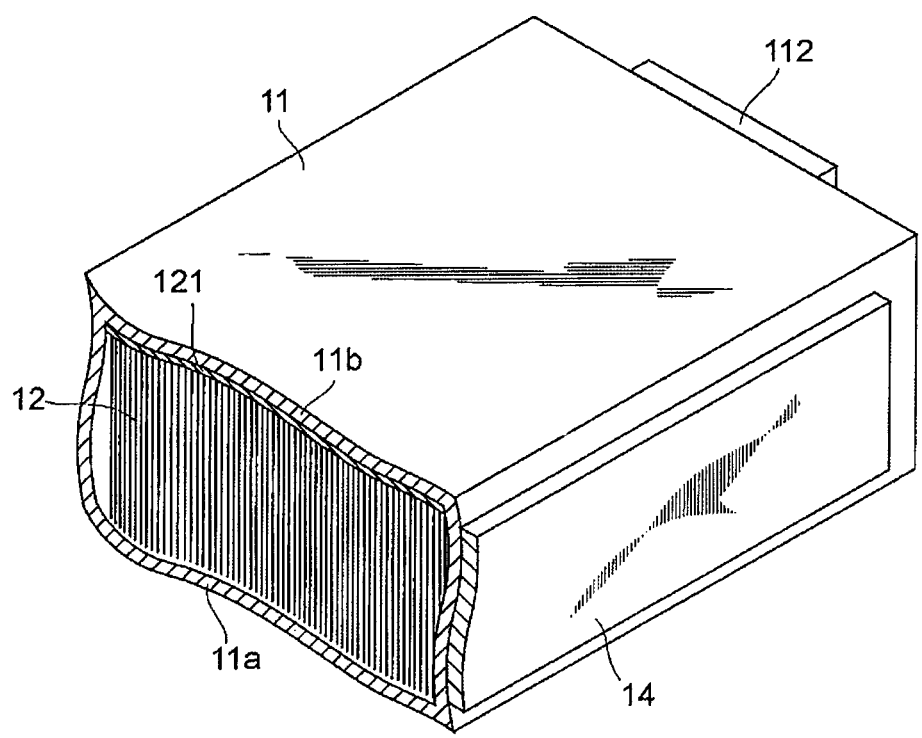
FIG. 3 is a schematic partial cross-sectional perspective view of an air purification system arranged in accordance with the present disclosure.

FIG. 3 is a schematic partial cross-sectional perspective view of the air purification system 10 as shown in FIG. 2. As shown in FIG. 3, a large number of flexible wires 12 are bonded to the conductive resin layer 121 formed on the inner surface of the upper portion 11*b*, and therefore an internal space of the chamber 11 is substantially filled with the flexible wires 12. The flexible wires 12 may typically form a grid pattern in a plane including the upper portion 11*b* and arranged at a predetermined pitch or interval. The pitch of the flexible wires 12 may be selected based on various factors such as, but not limited to, the diameter of the flexible wires 12, the amount of air flow, and the frequency of the sound wave generated by the sound wave generator 14. In general, a smaller diameter of the flexible wires 12 may allow the pitch thereof to become smaller. In a non-limiting example, the pitch of the flexible wires 12 may be approximately 1 mm with respect to the diameter of the flexible wires 12 of approximately 100 μm. In this case, the pitch of the flexible wires 12 is sufficiently larger than the diameter thereof, and accordingly ensures a sufficient airway in the chamber 11, as well as adequate surface areas of the flexible wires 12 for adsorbing the droplets. A shorter wavelength may be more advantageous for filtering to work more effectively because higher sound energy (i.e., sound pressure) can be generated and also the distance between the nodes can be shortened. However, an excessively-short wavelength may not be able to ensure the sufficient airway in the chamber 11, resulting in an increase in flow resistance/pressure drop. The diameter, pitch, and wavelength may vary depending on the particular air samples to be purified. The particular values can all be selected using routine optimization experiments.

Figure 4A:
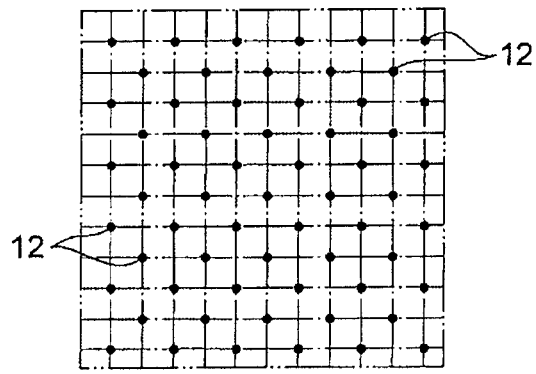
FIGS. 4A-4C are schematic illustrations of illustrative embodiments of alignments of flexible wires of an air purification system arranged in accordance with the present disclosure.
Figure 4B:
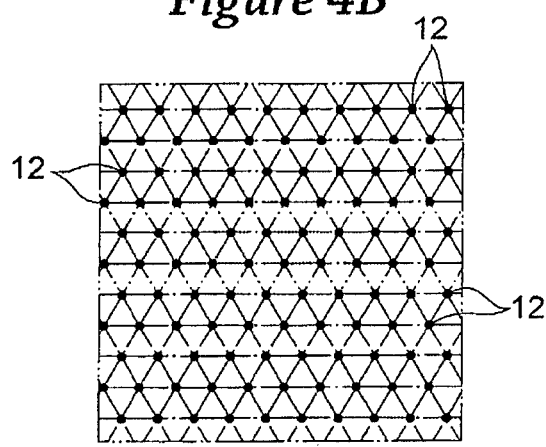
Figure 4C:
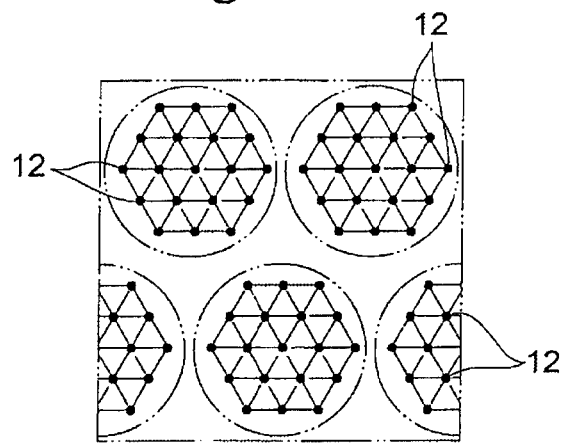

FIGS. 4A and 4B are schematic illustrations of illustrative arrangements of the flexible wires 12 of the air purification system 10 arranged in accordance with the present disclosure. Referring to FIG. 4A, the attachment points of the flexible wires 12 are arranged in a "zigzag" or "diamond" fashion as viewed from above. Alternatively, as shown in FIG. 4B, the flexible wires 12 are arranged such that each of the flexible wires 12 is positioned at each apex of equilateral triangles as viewed from above. Such arrangements of the flexible wires 12 may effectively receive an airflow flowing in the chamber 11. In a further example, the flexible wires 12 may be arranged to be clustered in certain regions that are included in the upper portion 11*b* as shown in FIG. 4C.

Figure 5:
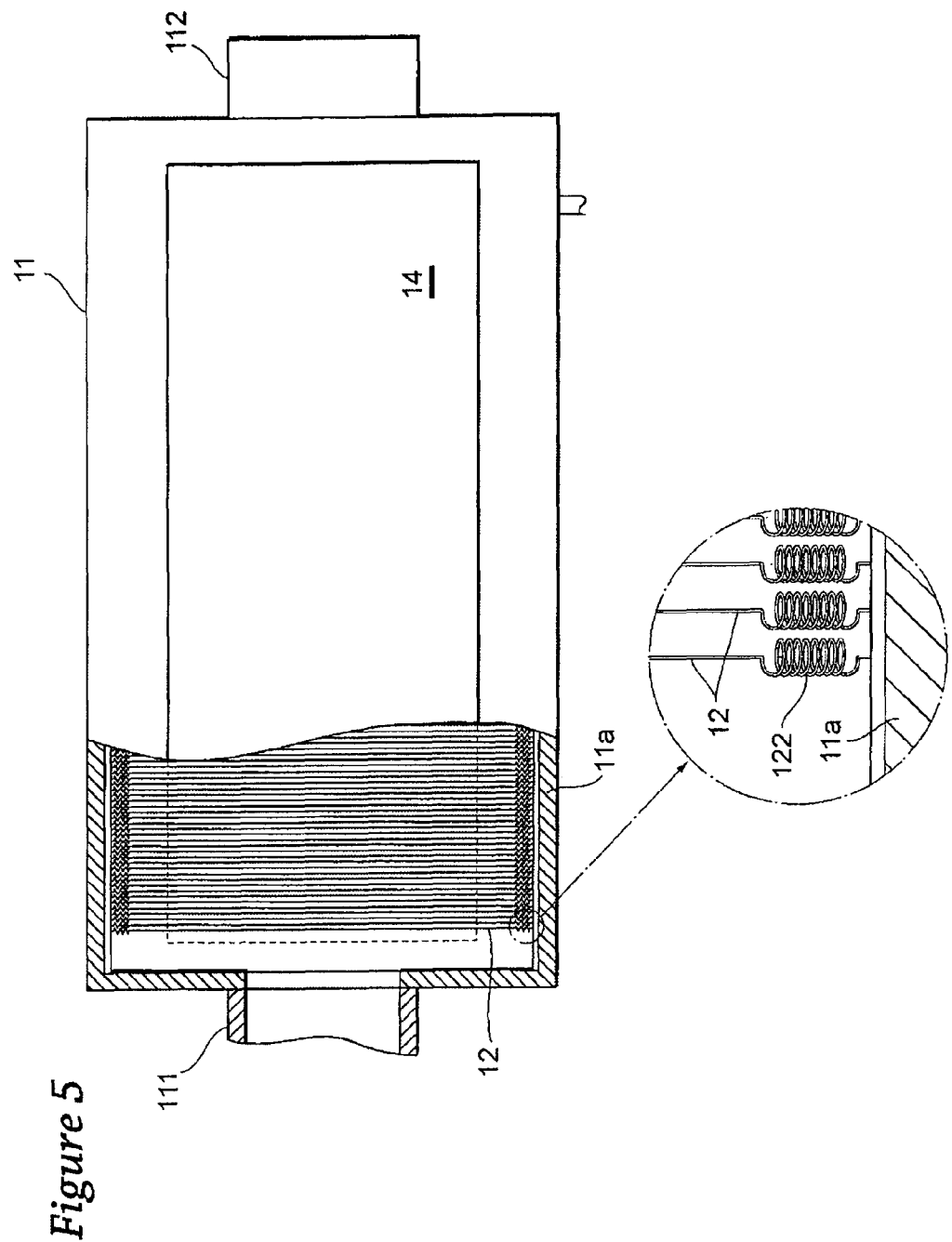
FIG. 5 is a schematic illustration of an example of flexible wires provided in a chamber of an air purification system arranged in accordance with the present disclosure.

FIG. 5 is a schematic illustration of an alternative example of the flexible wires 12 provided in the chamber 11 of the air purification system 10 arranged in accordance with the present disclosure. Referring to FIG. 5, each of the flexible wires 12 includes coils 122 at both ends thereof, which are attached to the lower portion 11*a* and the upper portion 11*b*, respectively. The coils 122 may be formed from, but not limited to, a resin material or a metal material. The coils 122 may be bonded to the wire portions by brazing or welding. The coils 121 located at both the ends of the flexible wires 12 allow the flexible wires to be elastically deformed, while both the ends are attached to the chamber 11. In another example, the coils 122 may be arranged at either upper or lower ends of the flexible wires 12.

Figure 6:
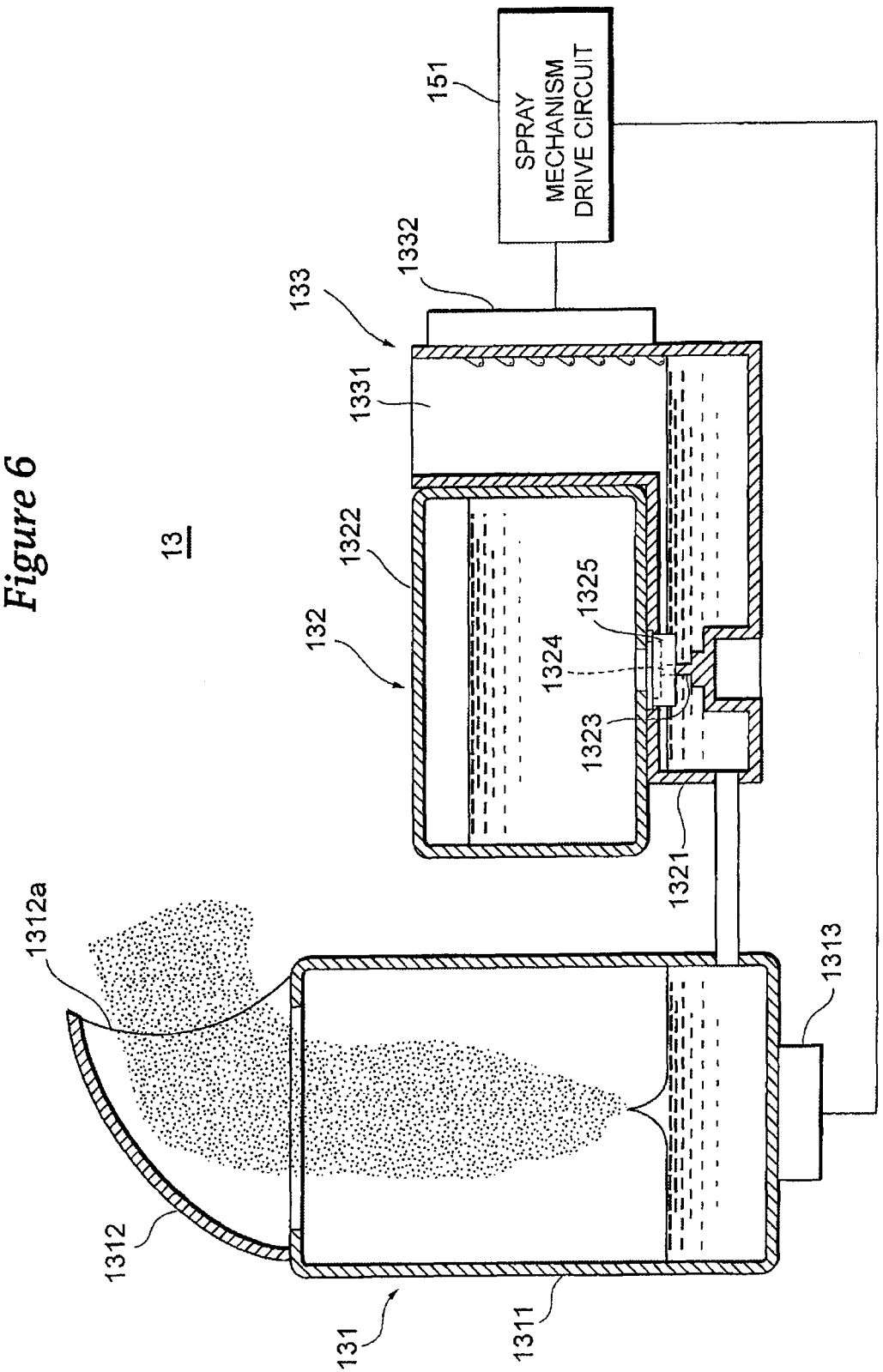
FIG. 6 is a schematic illustration of an example of an spray mechanism of an air purification system arranged in accordance with the present disclosure.

FIG. 6 is a schematic illustration of an example of the spray mechanism of the air purification system arranged in accordance with the present disclosure. Referring to FIG. 6, the spray mechanism 13 may include, but is not limited to, at least one ultrasonic atomizing unit 131 for atomizing liquid (e.g., water) into fine droplets and at least one water feed unit 132 for feeding water to the ultrasonic atomizing unit 131. The spray mechanism 13 may further include at least one water condenser unit 133 with at least one thermoelectric cooling device, such as a Peltier device, configured to cool the atmosphere and to condense water or moisture.

The ultrasonic atomizing unit 131 may include at least one vessel 1311 having at least one hood 1312 and at least one ultrasonic transducer 1313 located on a bottom of the vessel 1311. The ultrasonic transducer 1313 may include one or more piezoelectric devices to generate droplets from water contained in the vessel 1311. The ultrasonic transducer 1313 is driven at a self-resonant frequency by the spray mechanism drive device 151. During operation, the ultrasonic transducer 1313 vibrates in a thickness vertical vibration mode, and accordingly atomizes water into fine droplets. The size of fine droplets may be determined to a large extent depending on the size of pollutants to be removed from the air atmosphere. For example, the size of fine droplets may be between several μm and 100 μm. The atomized droplets are emitted from an opening 1312*a* of the hood 1312. The performance of the ultrasonic atomizing unit 131 may depend on various factors such as, among other things, the depth of water in the vessel 1311 and the resonant frequency of the ultrasonic transducer 1313.

In another example, the ultrasonic atomizing unit 131 may include at least one vibration plate that has minute through-holes and that is vibrated by the ultrasonic transducer 1313. In this configuration, the ultrasonic atomizing unit 131 may vibrate water through the vibration plate and emits fine droplets in the size of the through-holes from the through-holes.

Although the ultrasonic atomizing unit 131 is explained in the present disclosure, other means of creating spray and droplets of the appropriate size are also expressly envisioned. In other non-limiting examples, a sprayer which sprays droplets with a high-speed airflow or compressed air may alternatively be employed. Furthermore, a vaporizer for releasing steam and moisture may be applicable.

The water feed unit 132 includes at least one water tray 1321 communicating with the vessel 1311 and at least one cartridge-type reservoir 1322 seated on the water tray 1321. The water tray 1321 includes a push-up rod 1323 located so as to face a valve 1324 of a water feed cap 1325 of the reservoir 1322. The water tray 1321 is intended to feed supplementary water to the vessel 1311 from the reservoir 1322. It would be understood that, when the water level of the water tray 1321 becomes lower than the valve 1324, the water tray 1321 is refilled with an appropriate amount of the water from the reservoir 1322.

The water condenser unit 133 includes: at least one cooling chamber 1331 having an air inlet and communicating with the water tray 1321; and at least one Peltier device 1332 attached to the cooling chamber 1331. In one example, the water tray 1321 is shared by the water feed unit 132 and the water condenser unit 133. The water condenser unit 133 also feeds, to the water tray 1321, water that is condensed from saturated vapor in the atmosphere by the Peltier device 1332. It would be understood that the Peltier device 1332 is capable of creating a heat flux using electrical energy at a junction between two different types of materials.

Although the water feed unit 132 is configured to incorporate the water condenser unit 133 in the present disclosure, the water condenser unit 133 may be omitted. Alternatively, the reservoir 1322 may be omitted. In another example, the drain 113 of the chamber 11 may be arranged so as to communicate with the water tray 1321. The water which is drained from the chamber 11 may be filtered through a water purification filter, such as an activated charcoal filter, and then supplied to the water tray 1321. By way of this configuration, the droplets that are collected from the chamber 11 may be recycled.

FIG. 7 is a flow chart illustrating a method of using the air purification system 10 in accordance with the present disclosure. The method may be performed under the control of the control device 15 of the air purification system 10.

Referring to FIG. 7, in an operation 710, an ultrasonic wave is created in the form of a standing wave in the chamber 11. In an example, the frequency of the ultrasonic wave may be about 20 kHz. In synchronization with the creation of the standing wave, in an operation 720, droplets are generated and sprayed in the chamber. In some embodiments, the droplets may be formed concurrently with the formation of the standing wave, or may precede or follow the formation of the standing wave. In synchronization with the formation of the standing wave and/or formation of droplets, in an operation 730, air flow is created. In some embodiments, the air flow may be concurrent with droplets formation and/or standing wave creation, or may precede or follow either event.

Figure 8:
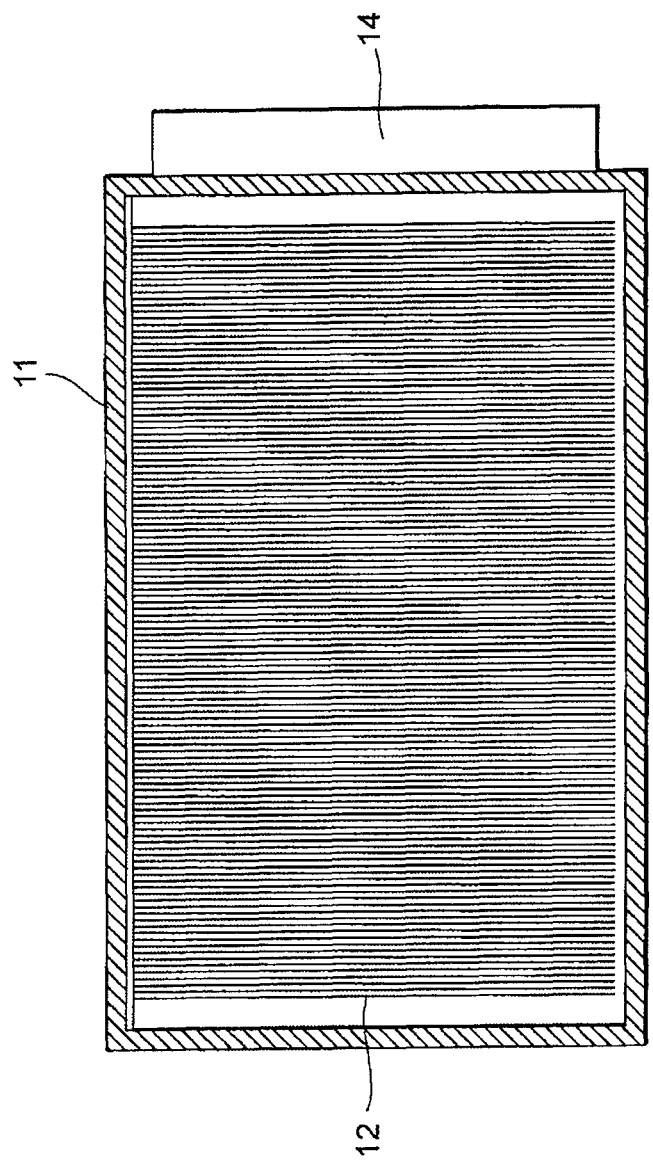
FIG. 8 is a schematic illustration of the arrangement of the flexible wires of an air purification system arranged in accordance with the present disclosure.
Figure 9:
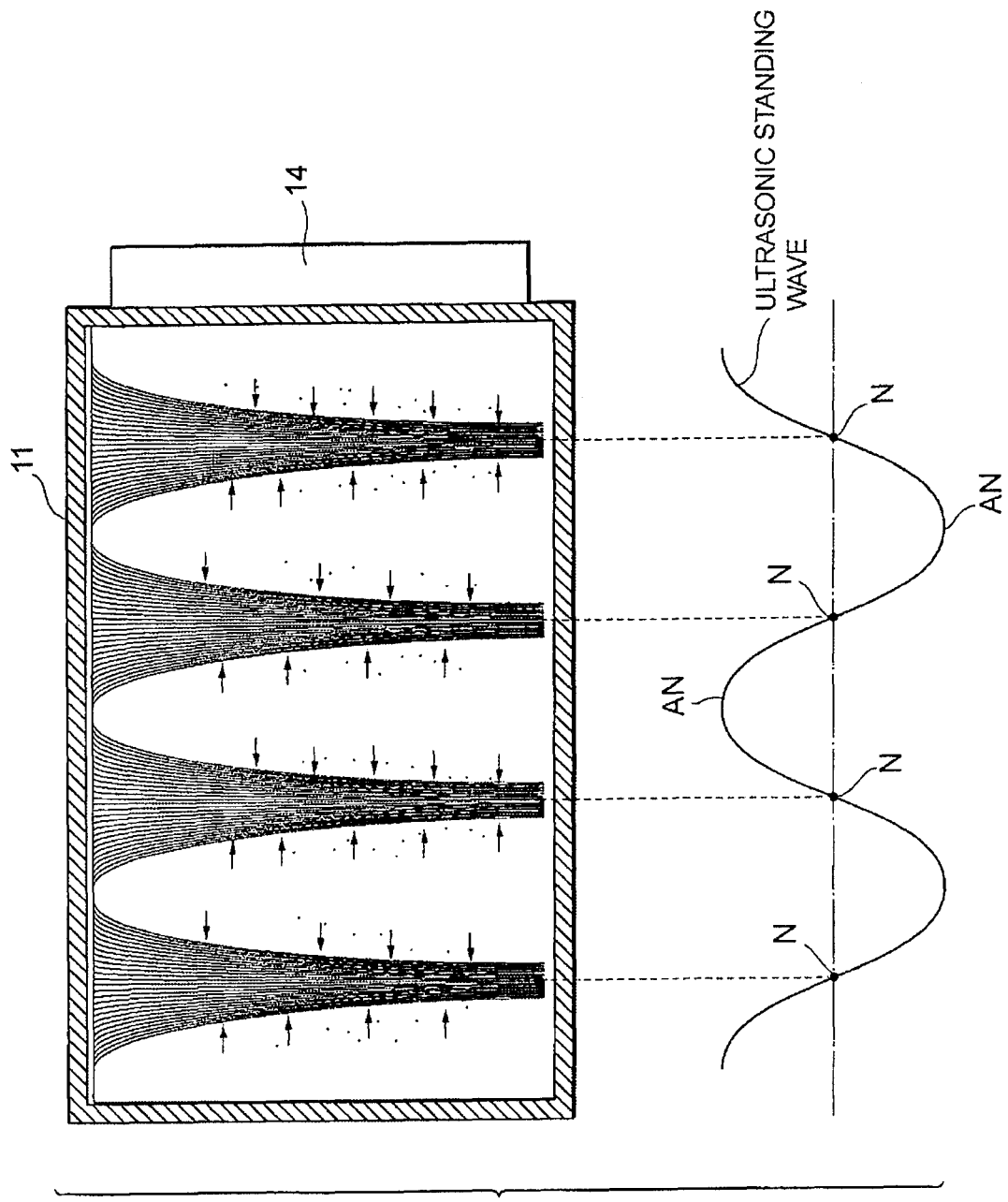
FIG. 9 is a schematic illustration of an effect of ultrasonic standing waves on the flexible wire arrangement of an air purification system arranged in accordance with the present disclosure.
Figure 10:
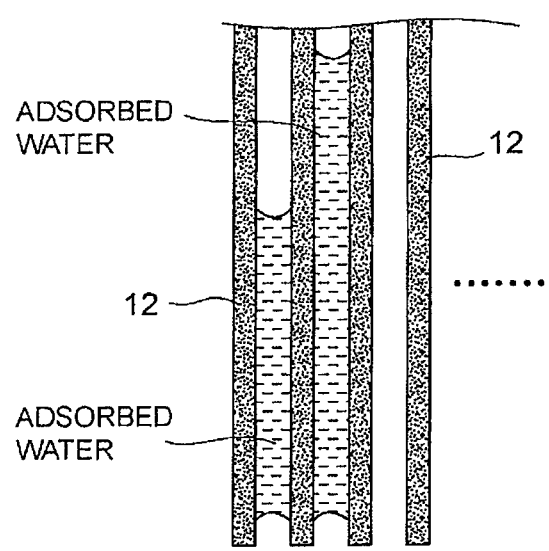
FIG. 10 is a schematic illustration of capillary action among the flexible wires in an air purification system arranged in accordance with the present disclosure.
Figure 11:
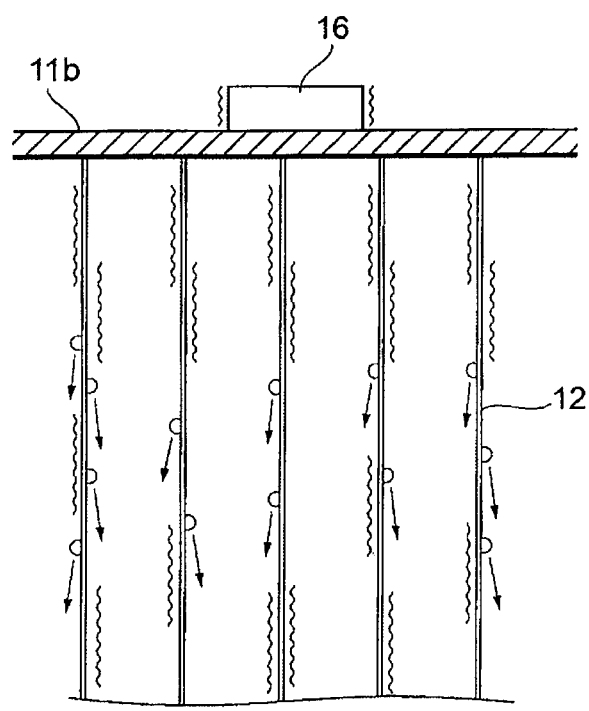
FIG. 11 is a schematic illustration of the release of entrapped drops from flexible wires in an air purification system arranged in accordance with the present disclosure.

FIGS. 8 and 9 are schematic illustrations explaining an operating principle of the air purification system 10 arranged in accordance with the present disclosure. Shown in FIGS. 8 and 9 are front, sectional views of the air purification system 10. In FIG. 8, the sound wave generator 14 is not functioning, and accordingly the flexible wires 12 hang directly downward. When the sound wave generator 14 is not operated, the spray mechanism 13 is optionally inactive as well.

When the sound wave generator 14 is active, the ultrasonic wave in the form of a standing wave is generated in the chamber 11. In synchronization with the operation of the sound wave generator 14, the spray mechanism 13 may also be turned on. In the ultrasonic standing wave field, any types of fine objects, i.e., not only particles, such as dust, viruses, and droplets, but also the flexible wires 12, can be affected by forces of the ultrasonic standing wave. More specifically, as shown in FIG. 9, the fine particles as well as the flexible wires 12 are moved by the sound radiation force that acts in a direction from the anti-nodes AN to the nodes N of the ultrasonic standing wave. The flexible wires 12 provided in the chamber 11 may be elastically deformed to be draped and aggregated at the nodes N. The fine droplets that move toward the nodes N, while trapping other fine particles, may collide against the bundle-like flexible wires 12 and the droplets may be adsorbed on the flexible wires 12 and aggregated thereon by capillary action as shown in FIG. 10, resulting in the growth of the droplets into drops that are large enough to fall to the bottom of the chamber 11. By way of this, the air purification system 10 can purify the air contaminated with pollutants.

In order to more efficiently remove the drops from the flexible wires 12, the chamber 11 may be equipped with at least one vibrator 16 as shown in FIG. 11. The vibrator 16 may be located on the upper portion 11*b* of the chamber 11. The vibrator 16 vibrates the flexible wires 12 through the chamber 11. The vibrator 16 may include piezoelectric devices arranged in an array. The vibration of the flexible wires 12 encourages the drops to flow downward on the wires more quickly and/or be vibrated free of the wires. The vibrator 16 may vibrate at, but not limited to, 1.6-2.4 MHz in a period of several seconds.

FIGS. 12A and 12B are schematic illustrations explaining an operating principle of flexible wires 120 with electrowetting action of the air purification system 10 arranged in accordance with the present disclosure.

In this example, the flexible wires 120 are each coated with a monolayer or a monomolecular film. The monolayer may be made by a self assembly method, and the resulting layer may be referred to as a self-assembled monolayer (SAM). For example, the ferrocenyl alkanethiol SAM (Fc-SAM) is intrinsically highly hydrophobic, but on the other hand, the Fc-SAM becomes highly hydrophilic when a voltage is applied thereto. In other words, the property of Fc-SAM can be switched between hydrophilicity and hydrophobicity through an electrochemical reaction.

Referring to FIG. 12A, the flexible wires 120 are electrically connected to a voltage control unit 17 through the conductive resin layer 121 formed on the upper portion 11*b* of the chamber 11. The voltage control unit 17 can apply an electrical potential (i.e., voltage) to the flexible wires 120.

During operation of the air purification system 10, a voltage is applied to the flexible wires 120 coated with the Fc-SAM. As discussed above, the droplets trapping the fine particles, as well as flexible wires 120, are attracted to the nodes of the ultrasonic standing wave by the sound radiation force. Accordingly, the droplets may be more efficiently adsorbed on the flexible wires 120 due to the hydrophilic property. The adsorbed droplets on the flexible wires 120 may grow into drops that are large enough to fall.

During non-operation, as shown in FIG. 12B, the voltage is not applied to the flexible wires 120, and the flexible wires 120 hang downward since there is no ultrasonic standing wave applied thereto. Since the properties of the flexible wires 120 have been switched to be hydrophobic, the droplets or drops on the flexible wires 120 may be encouraged to flow downwards more rapidly and/or to fall from the wires.

In another example, the flexible wires 12 may be made of a shape-memory-alloy (SMA). Due to the use of the SMA, the flexible wires 12 may substantially recover the initial shape thereof by Joule heating. As shown in FIG. 13, the air purification system 10 may include at least one power control unit 18 to supply electric power to the flexible wires 12. Thus, both the ends of each flexible wires 12 are electrically connected to the lower portion 11*a* and the upper portion 11*b* of the chamber 11, respectively. The flexible wires 12 having coils 122 as discussed with reference to FIG. 5 may be employed. The power control unit 18 applies an appropriate electric power to the flexible wires 12 to thereby produce Joule heating, which allows the flexible wires 12 to be substantially restored to the initial shape.

The flexible wires 12 may be deformed by the sound radiation force with long-term use. In this case, by supplying electric power, the shape of the flexible wires 12 can be restored.

FIGS. 14A and 14B are schematic illustrations explaining the behaviors of the flexible wires 12 under different frequency modes in the air purification system 10 arranged in accordance with the present disclosure. In this example, the sound wave generator 14 generates ultrasonic waves at different frequencies.

In FIG. 14A, the sound wave generator 14 is driven in a low frequency mode. This produces long intervals I between nodes N of the ultrasonic standing wave. On the other hand, in FIG. 14B, the sound wave generator 14 is driven in a high frequency mode so as to produce short intervals I between nodes N of the ultrasonic standing wave, which results in an enhancement in a sound energy (i.e., a sound radiation force) in the chamber 11. Accordingly, the trapping efficiency of the flexible wires 12 can be further improved. The sound wave generator 14 may have a plurality of frequency modes (e.g., 25, 40, 80, 120, and 170 KHz).

Figure 15:
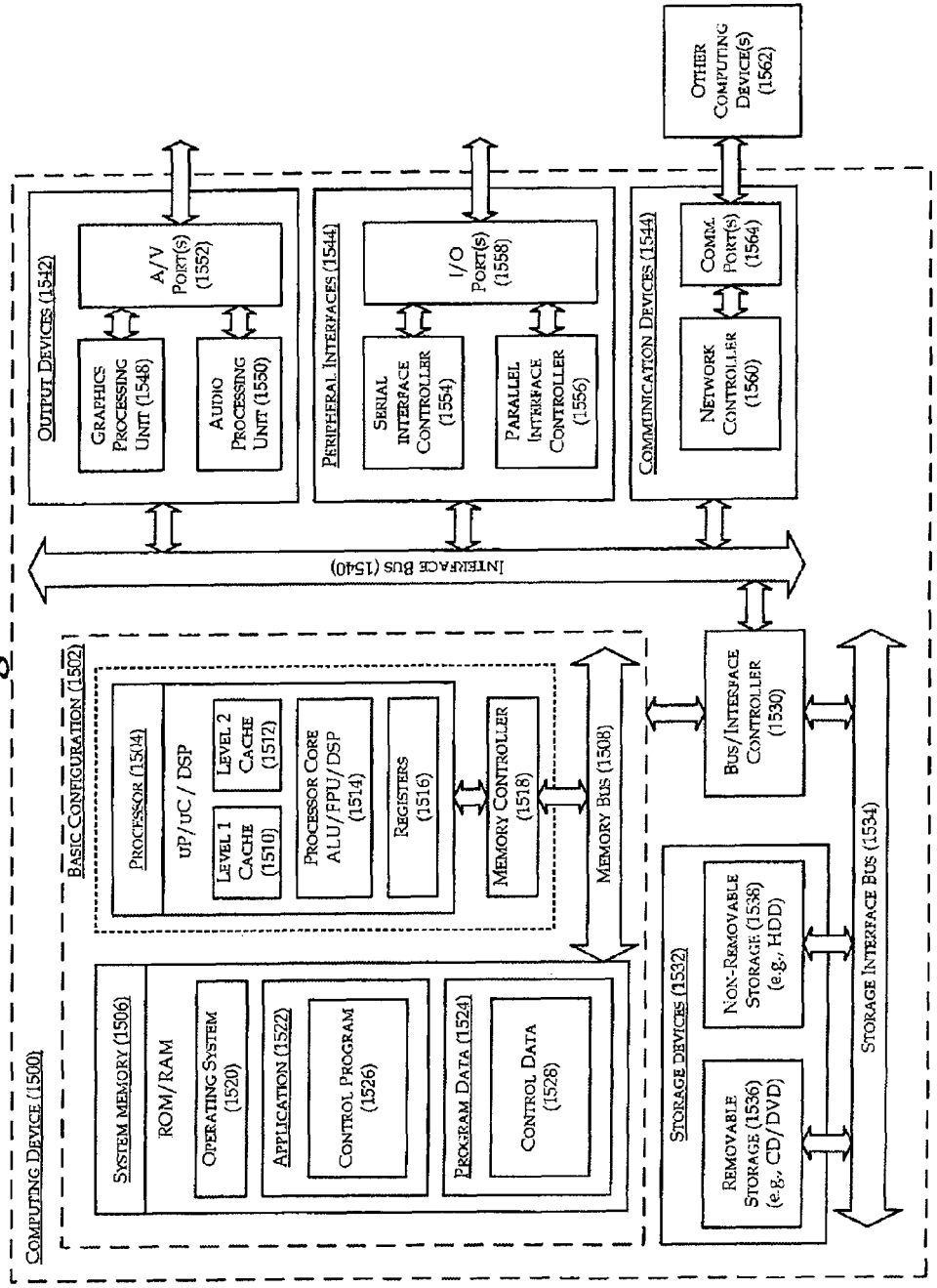
FIG. 15 is a block diagram illustrating an example computing device that is arranged for an air purification system in accordance with the present disclosure.

FIG. 15 is a block diagram illustrating an example computing device that is arranged for an air purification system in accordance with the present disclosure. In a very basic configuration 1502, computing device 1500 typically includes one or more processors 1504 and a system memory 1506. A memory bus 1508 may be used for communicating between the processor 1504 and the system memory 1506.

Depending on the desired configuration, the processor 1504 may be of any type including but not limited to a microprocessor (μP), a microcontroller (μC), a digital signal processor (DSP), or any combination thereof. Processor 1504 may include one or more levels of caching, such as a level one cache 1510 and a level two cache 1512, a processor core 1514, and registers 1516. An example processor core 1514 may include an arithmetic logic unit (ALU), a floating point unit (FPU), a digital signal processing core (DSP Core), or any combination thereof. An example memory controller 1518 may also be used with the processor 1504, or in some implementations memory controller 1518 may be an internal part of processor 1504.

Depending on the desired configuration, the system memory 1506 may be of any type including, but not limited to, volatile memory (such as RAM), non-volatile memory (such as ROM, flash memory, etc.) or any combination thereof. The system memory 1506 may include an operating system 1520, one or more applications 1522, and program data 1524. The application 1522 may include a control program 1526 that is arranged to control the air purification system 10. The control program 1526 may, for example, select one of the frequency modes of the sound wave generator. The control program may also control an amount of the droplets to be generated by the spray mechanism 13 in accordance with the selected frequency mode. Program data 1524 may include control data 1528 that may be useful for selecting a frequency mode based on air cleanliness detected by an air sensor. In some embodiments, application 1522 may be arranged to operate with program data 1524 on operating system 1520 such that an ultrasonic sound wave is generated at the selected frequency mode. This described basic configuration 1502 is illustrated in FIG. 15 by those components within the inner dashed line.

Computing device 1500 may have additional features or functionality, and additional interfaces to facilitate communications between basic configuration 1502 and any required devices and interfaces. For example, a bus/interface controller 1530 may be used to facilitate communications between basic configuration 1502 and one or more data storage devices 1532 via a storage interface bus 1534. The data storage devices 1532 may be removable storage devices 1536, non-removable storage devices 1538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1506, removable storage devices 1536 and non-removable storage devices 1538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1500. Any such computer storage media may be part of computing device 1500.

Computing device 1500 may also include an interface bus 1540 for facilitating communication from various interface devices (e.g., output devices 1542, peripheral interfaces 944, and communication devices 1546) to basic configuration 1502 via bus/interface controller 1530. Example output devices 1542 include a graphics processing unit 1548 and an audio processing unit 1550, which may be configured to communicate to various external devices such as a display or speakers via one or more A/V ports 1552. Example peripheral interfaces 1544 include a serial interface controller 1554 or a parallel interface controller 1556, which may be configured to communicate with external devices such as input devices (e.g., keyboard, mouse, pen, voice input device, touch input device, etc.) or other peripheral devices (e.g., printer, scanner, etc.) via one or more I/O ports 1558. An example communication device 1546 includes a network controller 960, which may be arranged to facilitate communications with one or more other computing devices 1562 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1500 may also be implemented as a personal computer including both laptop computer and non-laptop computer configurations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An air purification system comprising:

a chamber having an air inlet and an air outlet;

a plurality of flexible wires located in the chamber;

a spray mechanism configured to spray droplets in the chamber; and a sound wave generator configured to generate a standing sound wave in the chamber;

wherein the plurality of flexible wires are configured to be elastically deformed by the standing sound wave generated by the sound wave generator such that portions of the plurality of flexible waves converge at one or more nodes of the standing sound wave.

2. The air purification system according to claim 1, wherein one end of each wire of the plurality of flexible wires is attached to an upper portion of the chamber such that the plurality of flexible wires hang downward.

3. The air purification system according to claim 2, wherein the plurality of flexible wires forms a grid pattern in a plane including the upper portion of the chamber.

4. The air purification system according to claim 2, wherein the plurality of flexible wires forms a zigzag pattern in a plane including the upper portion of the chamber.

5. The air purification system according to claim 1, wherein each of the plurality of flexible wires includes coils at both ends thereof, wherein the both ends of each of the plurality of flexible wires are attached to an upper portion and a lower portion of the chamber, respectively.

6. The air purification system according to claim 1, wherein the plurality of flexible wires have surfaces that are coated with a self-assembled monolayer.

7. The air purification system according to claim 6, further comprising a voltage control unit configured to apply an electrical potential to the plurality of flexible wires.

8. The air purification system according to claim 1, wherein the plurality of flexible wires are made of shape-memory alloy.

9. The air purification system according to claim 8, further comprising a power control unit configured to apply electric power to the plurality of flexible wires sufficient to generate Joule heating to substantially recover an initial shape of the plurality of flexible wires.

10. The air purification system according to claim 1, wherein the spray mechanism includes an ultrasonic transducer configured to generate the droplets by vibration.

11. The air purification system according to claim 1, wherein the spray mechanism includes a sprayer to spray the droplets by a high-speed airflow.

12. The air purification system according to claim 1, wherein the spray mechanism includes a water condenser configured to condense water from saturated vapor in an air atmosphere, wherein the spray mechanism generates the droplets from the condensed water.

13. The air purification system according to claim 1, wherein the sound wave generator is configured to vary a frequency of the standing sound wave.

14. An air purification method comprising:
providing a plurality of flexible wires in a chamber including at least one air inlet and at least one air outlet, the plurality of flexible wires hanging downward in the chamber;
generating a standing sound wave in the chamber to deform the plurality of flexible wires by a force caused by the standing sound wave such that portions of the plurality of flexible wires converge to one or more nodes of the standing sound wave;
spraying droplets in the chamber; and
generating airflow from the air inlet to the air outlet,
whereby: the droplets move to the one or more nodes of the standing sound wave, while trapping particles in the air during the movement to the one or more nodes; and the droplets are adsorbed to the plurality of flexible wires at the one or more nodes.

15. The air purification method according to claim 14, wherein one end of each wire of the plurality of flexible wires is attached to an upper portion of the chamber such that the plurality of flexible wires hang downward.

16. The air purification method according to claim 15, wherein the plurality of flexible wires forms a grid pattern in a plane including the upper portion of the chamber.

17. The air purification method according to claim 15, wherein the plurality of flexible wires forms a zigzag pattern in a plane including the upper portion of the chamber.

18. The air purification method according to claim 14, wherein each of the plurality of flexible wires includes coils at both ends thereof, wherein the both ends of each of the plurality of flexible wires are attached to an upper portion and a lower portion of the chamber, respectively.

19. The air purification method according to claim 14, wherein the plurality of flexible wires have surfaces that are coated with a self-assembled monolayer.

20. The air purification method according to claim 19, further comprising applying an electrical potential to the plurality of flexible wires.

21. The air purification method according to claim 14, wherein the plurality of flexible wires are made of shape-memory alloy.

22. The air purification method according to claim 21, further comprising applying electric power to the plurality of flexible wires to generate Joule heating to recover an initial shape of the plurality of flexible wires.

23. The air purification method according to claim 14, wherein the spraying the droplets includes generating the droplets by vibration of an ultrasonic transducer.

24. The air purification method according to claim 14, wherein the spraying the droplets includes generating the droplets by a high-speed airflow.

25. The air purification method according to claim 14, further comprising condensing water from saturated vapor in an air atmosphere, wherein the condensed water is used to generate the droplets.

26. The air purification method according to claim 14, wherein the generating the standing sound wave includes varying a frequency of the standing sound wave.

* * * * *

UNITED STATES PATENT AND TRADEMARK OFFICE
CERTIFICATE OF CORRECTION

PATENT NO. : 8,845,785 B2
APPLICATION NO. : 13/262898
DATED : September 30, 2014
INVENTOR(S) : Kusuura It is certified that error appears in the above-identified patent and that said Letters Patent is hereby corrected as shown below:

On the Title Page

On Page 2, in item (56), under "OTHER PUBLICATIONS", in Column 2, Line 25, delete "unltrasonic" and insert -- ultrasonic --, therefor.

On Page 2, in item (56), under "OTHER PUBLICATIONS", in Column 2, Line 28, delete "unitrasonic" and insert -- ultrasonic --, therefor.

In the Drawings

Fig. 15, Drawing Sheet 16 of 16, delete "COMMUNICATION DEVICES (1544)" and insert -- COMMUNICATION DEVICES (1546) --, therefor.

Fig. 15, Drawing Sheet 16 of 16, delete "UP/UC/DSP" and insert -- µP/µC/DSP --, therefor.

In the Specification

Column 1, Line 65, delete "an spray" and insert -- a spray --, therefor.

Column 2, Line 56, delete "apparatus I" and insert -- apparatus 1 --, therefor.

Column 2, Line 57, delete "thereof" and insert -- thereof. --, therefor.

Column 4, Line 2, delete "made of;" and insert -- made of, --, therefor.

Column 4, Line 4, delete "range of;" and insert -- range of, --, therefor.

Signed and Sealed this
Twenty-sixth Day of May, 2015

Michelle K. Lee
*Director of the United States Patent and Trademark Office*

CERTIFICATE OF CORRECTION (continued)
U.S. Pat. No. 8,845,785 B2

Column 5, Line 63, delete "coils 121" and insert -- coils 122 --, therefor.

Column 10, Line 23, delete "controller 960," and insert -- controller 1560, --, therefor.

Column 10, Line 26, delete "ports 964." and insert -- ports 1564. --, therefor.